(12) United States Patent
Chaudhry

(10) Patent No.: US 9,485,536 B1
(45) Date of Patent: Nov. 1, 2016

(54) METHOD AND SYSTEM FOR UPDATING PROGRAMMING LISTING DATA FOR A BROADCASTING SYSTEM

(75) Inventor: Kapil Chaudhry, Cerritos, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1660 days.

(21) Appl. No.: 12/203,760

(22) Filed: Sep. 3, 2008

(51) Int. Cl.
| H04N 21/462 | (2011.01) |
| H04N 21/262 | (2011.01) |
| H04N 21/84 | (2011.01) |
| H04N 21/482 | (2011.01) |
| H04N 5/445 | (2011.01) |

(52) U.S. Cl.
CPC ...... *H04N 21/4622* (2013.01); *H04N 5/44543* (2013.01); *H04N 21/262* (2013.01); *H04N 21/26283* (2013.01); *H04N 21/462* (2013.01); *H04N 21/482* (2013.01); *H04N 21/84* (2013.01)

(58) Field of Classification Search
USPC .............................................. 725/48, 50, 39
See application file for complete search history.

(56) References Cited

U.S. PATENT DOCUMENTS

| 5,666,645 | A * | 9/1997 | Thomas et al. ................ 725/47 |
| 6,216,265 | B1 * | 4/2001 | Roop et al. ................... 725/54 |
| 6,268,849 | B1 * | 7/2001 | Boyer et al. ................... 725/40 |
| 6,314,571 | B1 * | 11/2001 | Ogawa et al. ................ 725/48 |
| 6,374,402 | B1 | 4/2002 | Schmeidler et al. |
| 6,925,650 | B1 | 8/2005 | Arsenault et al. |
| 6,934,964 | B1 | 8/2005 | Schaffer et al. |
| 6,968,364 | B1 | 11/2005 | Wong |
| 7,571,454 | B2 * | 8/2009 | Potrebic et al. ............... 725/50 |
| 7,640,579 | B2 | 12/2009 | Shewchuk et al. |
| 8,539,237 | B2 | 9/2013 | Monteiro et al. |
| 2002/0046407 | A1 | 4/2002 | Franco |
| 2003/0028892 | A1 | 2/2003 | Gewickey et al. |
| 2003/0095791 | A1 | 5/2003 | Barton et al. |
| 2003/0204497 | A1 | 10/2003 | Kalogeraki et al. |
| 2004/0068742 | A1 * | 4/2004 | Cushing et al. ............... 725/50 |
| 2005/0022237 | A1 * | 1/2005 | Nomura ........................ 725/39 |
| 2005/0044377 | A1 | 2/2005 | Huang |
| 2005/0086683 | A1 | 4/2005 | Meyerson |
| 2005/0114155 | A1 | 5/2005 | Hodges et al. |
| 2005/0138654 | A1 | 6/2005 | Minne |
| 2005/0192987 | A1 | 9/2005 | Marsh |
| 2005/0235047 | A1 | 10/2005 | Li et al. |
| 2005/0251825 | A1 | 11/2005 | Fukuda et al. |
| 2006/0037060 | A1 * | 2/2006 | Simms et al. ................ 725/119 |
| 2006/0107300 | A1 | 5/2006 | Hirayama |
| 2006/0107304 | A1 | 5/2006 | Cleron et al. |

(Continued)

FOREIGN PATENT DOCUMENTS

| EP | 1357734 | 10/2003 |
| EP | 1357734 A1 | 10/2003 |

(Continued)

*Primary Examiner* — Jun Fei Zhong
(74) *Attorney, Agent, or Firm* — Harness, Dickey & Pierce, P.L.C.

(57) ABSTRACT

A method and system for processing listing data includes a listing system having a listing database associated therewith, an external data source communicating station data, external schedule data and external program data to a listing system and an internal source communicating internal program data to the listing system. The listing system stores the station data, external schedule data and external program data and the internal program data in the database. The listing system communicates the listing data to other systems using the listing data such as a program guide system.

19 Claims, 12 Drawing Sheets

(56) References Cited

U.S. PATENT DOCUMENTS

| | | |
|---|---|---|
| 2006/0117342 A1 | 6/2006 | Park et al. |
| 2006/0271996 A1 | 11/2006 | Sato |
| 2007/0107019 A1 | 5/2007 | Romano et al. |
| 2007/0143788 A1 | 6/2007 | Abernethy et al. |
| 2007/0186254 A1 | 8/2007 | Tsutsui et al. |
| 2007/0283404 A1 | 12/2007 | Xu et al. |
| 2007/0288967 A1 | 12/2007 | Candelore et al. |
| 2008/0098450 A1 | 4/2008 | Wu et al. |
| 2008/0134277 A1 | 6/2008 | Tucker |
| 2008/0148351 A1 | 6/2008 | Bhatia et al. |
| 2008/0178239 A1 | 7/2008 | Yampanis |
| 2008/0235513 A1 | 9/2008 | Foster et al. |
| 2008/0282291 A1 | 11/2008 | Henty |
| 2008/0307463 A1 | 12/2008 | Beetcher et al. |
| 2009/0037962 A1 | 2/2009 | Benco et al. |
| 2009/0089870 A1 | 4/2009 | Wahl |
| 2009/0113489 A1 | 4/2009 | O'Neil |
| 2009/0119410 A1 | 5/2009 | Yang et al. |
| 2009/0193478 A1 | 7/2009 | Jones |
| 2009/0199283 A1 | 8/2009 | Jain |
| 2011/0225417 A1 | 9/2011 | Maharajh et al. |

FOREIGN PATENT DOCUMENTS

| | | |
|---|---|---|
| EP | 1482735 A1 | 12/2004 |
| WO | 02071191 | 9/2002 |
| WO | 2004097662 | 11/2004 |

\* cited by examiner

METHOD AND SYSTEM FOR UPDATING PROGRAMMING LISTING DATA FOR A BROADCASTING SYSTEM

TECHNICAL FIELD

The present disclosure relates generally to communication systems, and more particularly, to a method and system for updating programming listing data at a primary service provider.

BACKGROUND

The statements in this section merely provide background information related to the present disclosure and may not constitute prior art.

Communication systems such as pay or subscription communication systems include a primary service provider and a user receiver device such as a set top box or integrated receiver decoder. The user device is typically provided with authorization to communicate with the primary service provider and receive services therefrom. One example of such a system is a satellite television system such as DIRECTV®. Broadcast television channels and other internal programs are provided by the primary service provider. Another service provided by a primary service provider is providing program guide data which is used by a user device to display a grid guide on a display associated with the user device.

Broadcasting channel data used for the program guide may come from many sources. The broadcasting channel data may be used by many other broadcast system components. Coordinating data in the broadcasting system has been difficult due to the numerous systems involved and the ever-evolving architectures. Broadcast data may change several times throughout a day, particularly in a day in which many sporting events are shown. In previous systems, the components received data in such a way as to allow the data to be out of synch at data using systems. The data using systems ultimately provide the data in some form to end users. The end users may be set top box users, wireless device users or users of a website. Different systems used for different devices may convey different data to end users. This may lead to customer confusion or frustration.

SUMMARY

The present disclosure provides a system to receive data from both internal and external sources. The system includes a listing system that provides a centralized source for both receiving data and for communicating data. This allows current data to be provided or all data using systems. Such data may change throughout a broadcast day.

In one aspect of the disclosure, a method includes communicating a station, schedule data and program data to a listing system, communicating guide channel data to a listing system, communicating broadcast channels to the listing system, forming a listing database from the guide channel data, the broadcast channel data station data, schedule data and program data and communicating listing data from the listing database to an external system.

In a further aspect of the disclosure, a method includes parsing external data from an external source, determining at least one of station data, external program data and external schedule data from the external data in response to parsing, adding the at least one of station data, external program data and external schedule data to a database when the at least one of station data, external program data and external schedule data is not in a listing database and updating the at least one of station data, external program data and external schedule data in the database when the at least one of station data, external program data and external schedule data is in a listing database.

In another aspect of the disclosure, a system includes a listing system having a listing database associated therewith, an external data source communicating station data, external schedule data and external program data to a listing system and an internal source communicating internal program data to the listing system. The listing system stores the station data, external schedule data and external program data and the internal program data in the database.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
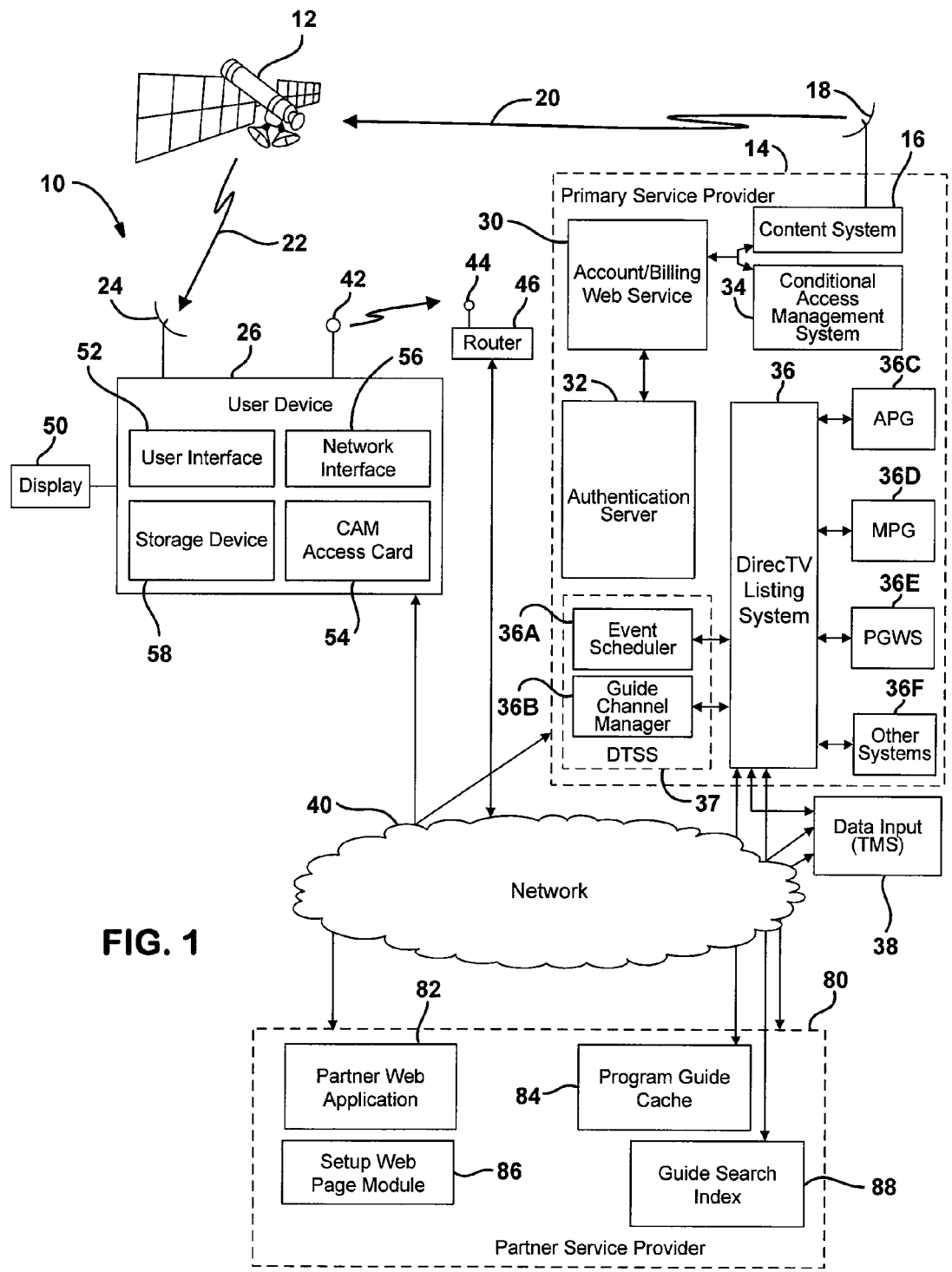
FIG. 1 is a block diagrammatic view of a satellite communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

Referring now to FIG. 1, a satellite television broadcast system 10 is illustrated. The satellite television broadcast system 10 is illustrated by way of example. However, the present disclosure is not so limited as mentioned above. The television broadcast system 10 includes a satellite 12 that receives content or programming from a primary service provider 14. More specifically, the primary service provider 14 includes a content system 16 that generates uplink signals 20 corresponding to content through an uplink antenna 18. As mentioned above the content may be various types of content including but not limited to live content, recorded content, pay-per-view content and on-demand content. The uplink signals 20 may be television signals and more specifically digital television signals. The uplink signals may also be data including but not limited to interactive television data and program guide data. The uplink antenna 18 communicates the uplink signals 20 to the satellite 12 which in turn generates downlink signals 22. The downlink signals 22 are communicated to a receiving antenna 24 on a user device 26. Although only one user device 26 is illustrated, several user devices may be provided in the system 10. The uplink signals 20 and downlink signals 22 may be referred to as communication signals. Communication signals are wireless communication signals and may include various types of entertainment content, data, traffic, weather, hazardous material warnings, advertising material, guide data and the like. As mentioned above, this system may be suitable for wired systems such as cable televisions and terrestrial wireless systems.

The user device 26 may include a satellite television receiver, set top box or a digital video recorder. The satellite television receiver may also be referred to as an integrated receiver decoder. Of course, other types of user devices may be used such as a cable television set top box. Other types of user devices may also include a mobile device such as a lap top computer, cellular phone, personal digital assistant, a portable media player or an automotive-based television receiving device. Thus, the user device 26 may be a fixed user device in the case of a satellite television set top box or a mobile user device. Both fixed and mobile devices may be used in a system.

The primary service provider 14 may also include an account/billing web service 30 and an authentication server 32. The authentication server 32 may include an authentication server for generating and validating user devices using eTokens or other processes.

The primary service provider 14 may also include a conditional access management system 34. The conditional access management system 34 may be used to grant conditional access to various programming as well as provide recording commands to the user device 26 as will be described below.

The primary service provider 14 may also include a DIRECTV® listing system (DLS) 36. The listing system 36 may be in communication with an event scheduler 36A, which may also be referred to or be a part of a DIRECTV® traffic and scheduling system (DTSS) 37. The event scheduler may be stand alone or a module within the DTSS 37. The DIRECTV® listing system 36 may also be in communication with a guide channel manager (GCM) 36B may also be stand alone or part of the DTSS 37. The listing system may also be in communication with an advance program guide module 36C, a program guide generator 36D, a program guide web service 36E and other systems 36F. The interaction of the DIRECTV® listing system 36 and the various modules 36A-36F will be further described below in FIG. 2. In summary, the listing system receives various data from the various systems which may be used to generate program guide data.

An external data input 38, such as Times Media Service (TMS), may be used for receiving various data regarding programming. Times Media Service is just one example of an external data service. The external data input 38 may provide channels, programs and schedules as an input to the listing system 36. The external data input 38 may provide various types and formats of data. A data stream may be provided with various types of information regarding programming.

The user device 26 is in communication with the primary service provider 14 through a network 40. The network 40 may be a secured network or use a secure protocol. The network 40 may include a broadband network through which the user device 26 communicates with the primary service provider 14. The network 40 may be a wired network such as a public-switched telephone network (PSTN) or a broadband Internet network. The network may be wireless such as a cellular or wireless Internet system. The broadband network may communicate wired, wirelessly or a combination of both. For example, the user device 26 may include a wireless antenna 42 for communicating with an antenna 44 of a router 46 which, in turn, is in communication with the network 40.

The network 40 may also be an intranet. The components of both the primary and partner service provider may be located separately or in the same building.

The user device 26 may be associated with a display 50 for displaying content and programming, as well as displaying various types of user commands, or the like. The display 50 may be a television or display integrated into the device. The display 50 may include speakers for an audio display.

The display 50 may be used for displaying primary content from a primary service provider and secondary content from a secondary service provider.

The user device 26 may include a user interface 52, such as a keyboard, remote control, or the like, for selecting and entering various types of information by the user. The user device 26 may also include a conditional access module 54 that allows the user to access the programming provided from the content system 16. The conditional access module 54 may be referred to as an access card. The conditional access module 54 may include various activation codes without which the user device is not activated. The conditional access module 54 may include a conditional access module identifier such as a number or a code.

The user device 26 may also include a network interface 56 for interfacing with the network 40. For example, the network interface 56 may communicate wirelessly through the antenna 42 or through a direct connection such as an Ethernet connection. The network interface 56 may be but is not limited to a wireless broadband interface, a broadband interface, a modem-type interface or a public-switched telephone network interface.

The user device 26 may also include a storage device 58. The storage device 58 may store various content received from the primary service provider therein. The content may be received through the satellite 12 or through the network 40 through the network interface 56. The storage device 58 may be a hard disk drive or memory chip-based device. The storage device 58 may be referred to as a digital video recorder.

The primary service provider 14 may be in communication with a partner service provider 80. The partner service provider 80 may include a partner web application 82, a program guide cache 84, and a setup web page module 86. The partner web application 82 may generate various types of web content. For example, the partner web application 82 may generate a homepage-type display. The homepage display may receive information from the program guide cache 84 to fill a TV listing portion of the homepage display.

The setup web page module 86 may be used to setup various types of user network devices to communicate with the partner service provider 14 as will be described below.

The partner service provider 80 may also include a guide search index 88. The guide search index 88 may be in communication with the data web service 36 and, in particular, the guide search web service 36D. The guide search index 88 may enable the partner service 80 to obtain search criteria from a user, client or client device interacting with the partner service provider 80. Operation of this interface is described below.

It should be noted that the components (82-88) within the partner service provider 80 may be physically located together with the primary service provide 14. The components are distributable individually or together. The primary service provider 14 may have these components as a mere convenience to enable the partner service to quickly provide certain services offered by the primary service provider 14.

Figure 2:
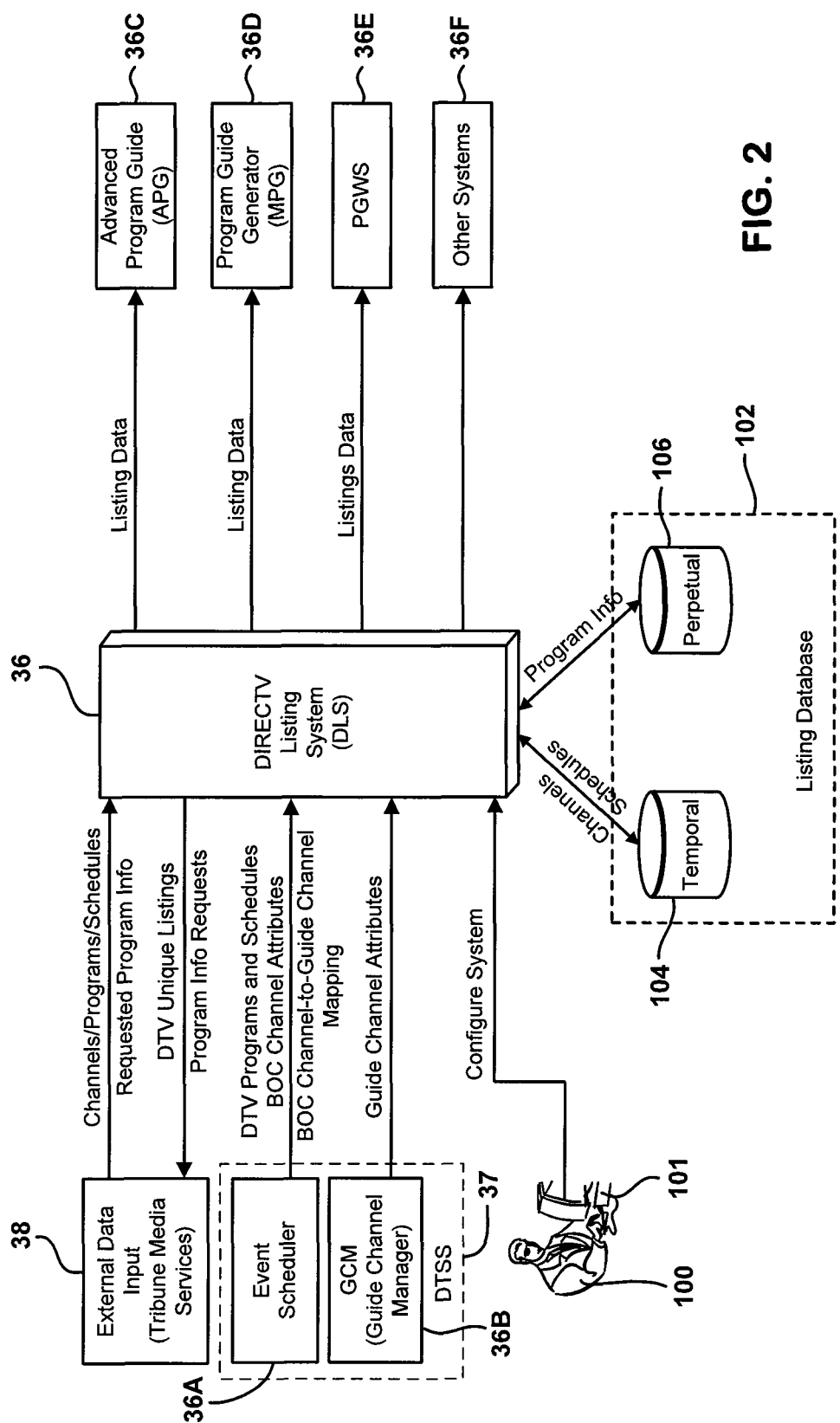
FIG. 2 is a detailed block diagrammatic view of a listing system according to the present disclosure.

Referring now to FIG. 2, the listing system 26 and its associated inputs and outputs (36A-36F, 38) are illustrated in further detail.

An operator 100 through a terminal 101 may manually configure various settings within the DIRECTV® listing system 36. For example, the formats of listing data provided to the various systems may be manually set. Also, time settings and the like for receiving updates may also be provided manually. The terminal 101 may also be used for monitoring the status of various components and intercommunications within the system. Examples of such will be described below.

The DIRECTV® listing system 36 may be in communication with a listing database 102 that has a temporal memory 104 and a perpetual memory 106. Channels and schedules may be stored in the temporal memory 104 and program info may be stored within the perpetual memory 106.

The event scheduler 36A is used to provide various data such as the channel, schedule, channel mapping, program associated data (PAD), channel information, program information packets (PIPs). The event scheduler 36A may be referred to as an internal data source since some of the data may be for internal programming provide by the primary service provider such as pay-per-view and the like. The data provided by the event scheduler 36A will support searches in various fields of stored information relative to available programming. For example, the data from the event scheduler 36A may be searchable using keywords in fields such as but not limited to Program Reference Identifier, Program Title, Program Category, Program Credits Channel Short Name or in one or more specific fields such as but not limited to Program Title, Episode Title, Program Description, Program Category, Program Credits and Air Date, Run Length, Rating, Channel Short Name. The searching may be performed for linear content as well as non-linear content.

The event scheduler 36A may also be used to provide broadcast operation channel attributes and broadcast operation channel to guide channel mapping. The mapping is used to link various channels to the guide channels and thus the channels viewers may use to view the particular programming. When changes are made in the programs and schedules or the mapping, the event scheduler may notify the listing system 36. For pay-per-view programming, the DIRECTV® listing system may request further program information from the external data input 38.

Guide channel data is also provided by the guide channel manager 36B. The guide channel manager 36B may provide guide channel attributes to the DIRECTV® listing system 36. Examples of data the guide channel manager 36B may provide include channel data including local channel configuration data, the content channel identifier, a long name of the channel, a channel category, a logo index, a network affiliation, a channel URL, an BD/SD hide channel flag, an audio identifier, a minor channel identifier, a PIP channel number, and the like.

The information or the data provided by the event scheduler 36A, the guide channel manager 36B and the external data input 30A is used to form the entries in the listing database 102. The listing data may be used by several systems such as the advance program guide system 36C, the program guide generator (MPG) 36D and the program guide web service 36E. Other systems 36F may also use the listing data from the listing database.

The program guide web service 36E may be used to generate program guide data and information regarding various programming that is available. The program guide web service 36E, as will be described below, may generate custom programming guide information based upon the subscription to which a user is subscribed. The custom guide information may be formatted for a particular consumer. The program guide web service 36E may also provide generic or non-customized content when specific user attributes are not known. When user attributes such as location and subscription information are known, only the content available to the particular subscriber may be included in the program guide.

Additional content may be provided for advertising purposes. Thus, channel data for particular channels may be provided in the program guide.

The program guide web service 36E may generate program guide data for both linear and non-linear content. Linear content are television shows broadcasted at a particular time and a particular channel. Network television programming is an example. Non-linear content is programming that is not tied to a particular time such as on-demand content that can be requested at the user's discretion.

The program guide web service 36E may communicate with the listing system 36 using Java Remote Message Invocation (RMI) over Internet Inter-Orb Protocol (IIOP).

By providing a centralized listing system and listing database 102, updates may be provided nearly simultaneously with each of the other systems using the listing data. For example, the advance program guide system 36C, the program guide generator 36D and the PGWS may all be provided information simultaneously. Likewise, any other systems 36F may also be provided the same information simultaneously or nearly simultaneously. In this manner, all of the systems may thus be synchronized and thus provide consumers with the same program guide schedules. In the past, updates to data took some time and thus some systems were not updated more than once per day. As things changed, the program guide displayed on a set top box may be different than that displayed on a website.

Figure 3:
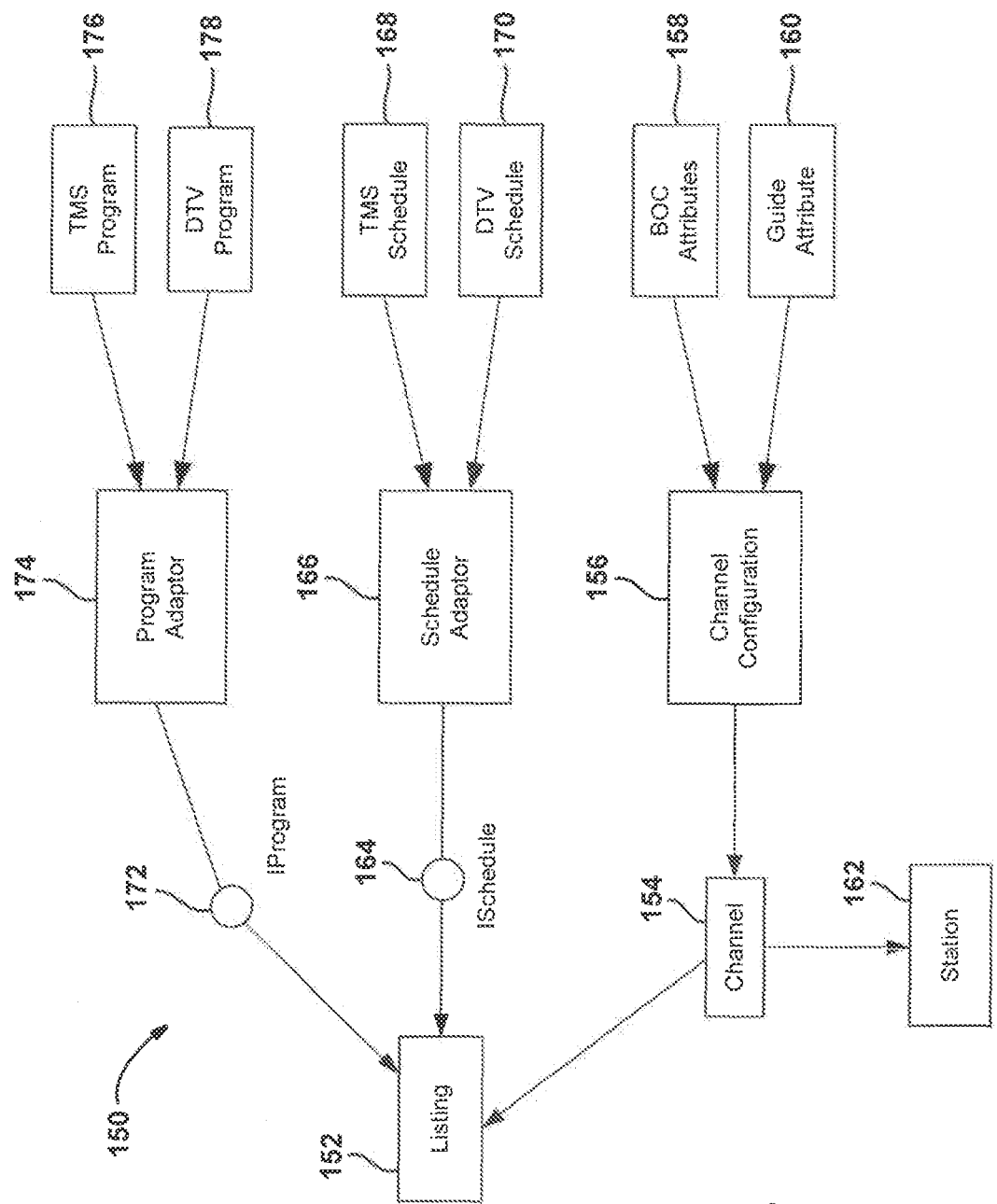
FIG. 3 is an illustration of a listing data structure.

Referring now to FIG. 3, a listing data structure 150 is illustrated in further detail. As can be seen, the primary components of the data listing are the channel, the schedule and the program. The components form a listing 152 which is stored in the listing database 102 described above. As can be seen, each listing includes a channel 154 that is associated with one or more channel configurations 156. Each channel configuration 156 includes broadcast operations channel attributes 158 and a guide attribute object 160. The channel configuration 156 may also be associated with a start time and an end time. The channel 154 may also be associated with the broadcast station 162. The schedule 164 of the listing 152 may be obtained from a schedule adapter 166. The schedule adapter may obtain the schedule from the external data source or TMS schedule 168 or the DIRECTV® or internal schedule source 170. That is, the schedules may be classified in two manners including an internal schedule and an external schedule.

A program 172 is also part of the listing 152. A program 172 can exist in the database without any associated schedules but a schedule must have an associated program. The programs may be formed in a program adapter 174 which receives information from an external source such as the TMS program 176 or an internal source such as the DIRECTV® program source 178.

It should be noted that the TMS or external schedule is associated with a station whereas the internal schedule is associated with a channel.

Figure 4:
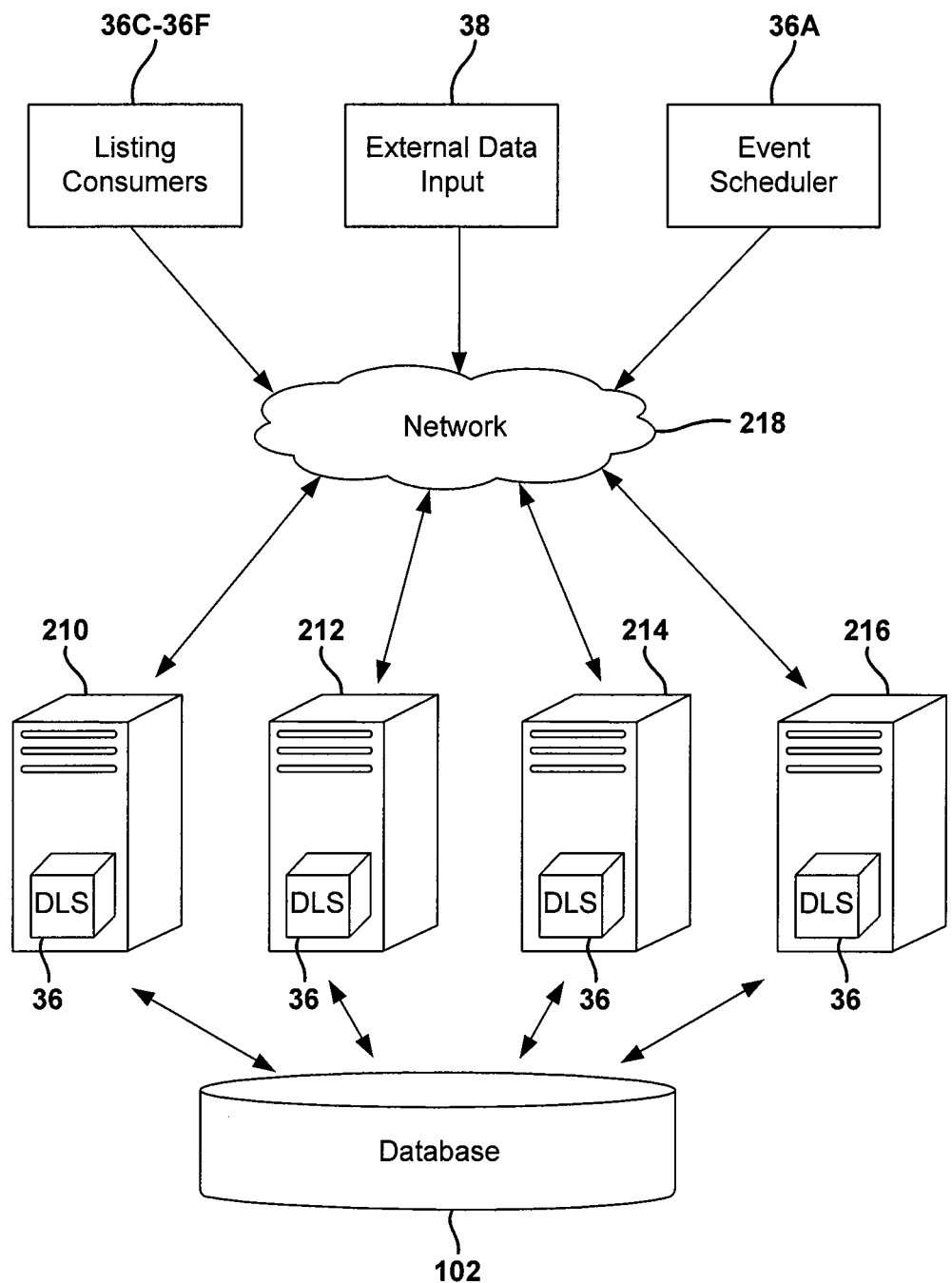
FIG. 4 is a block diagrammatic view of a distributed listing service.

Referring now to FIG. 4, the DIRECTV® listing system 36 of FIGS. 1 and 2 may also be provided in a multicast mode. That is, the DIRECTV® listing system 36 may be divided among multiple servers 210, 212, 214, and 216. Each server may contain a listing system 36. The database 102 may be in communication with each of the listing servers. A multicast communication scheme may be implemented between the servers 210-216 and the other components such as the listing consumers 36C-36F, the external data input 38 and the event scheduler 36A. The network 218 may be used to provide simultaneous input from the various servers to the listing consumers 36C-36F and may also be used to receive information for the listing systems 36 through the various servers 210-216. By providing multiple servers 210-216, the load of the inputs and outputs of the system may be distributed.

Figure 5:
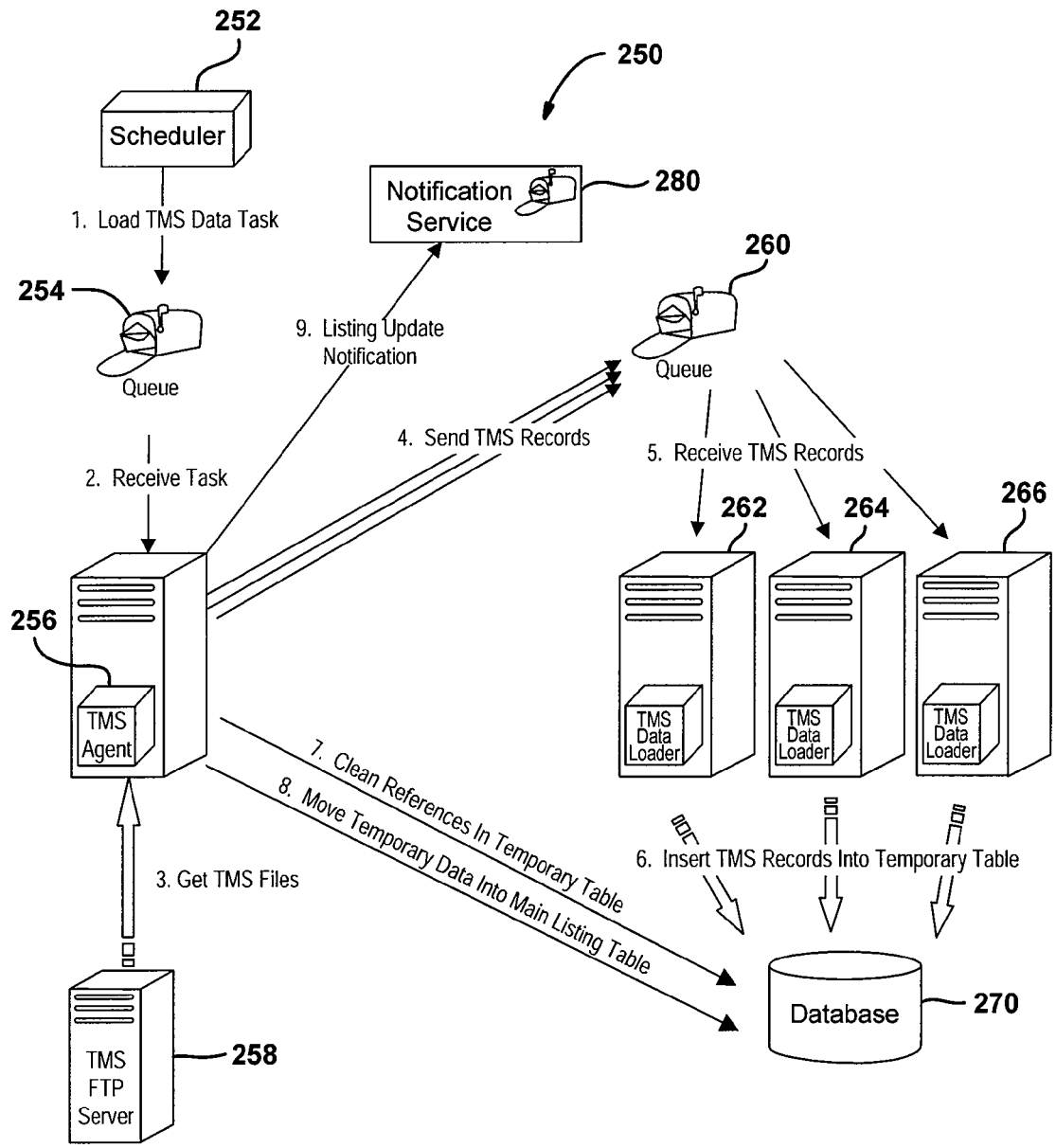
FIG. 5 is a block diagrammatic view of an external data load architecture.

Referring now to FIG. 5, a TMS data load architecture 250 is illustrated as a pull model as opposed to a push model. A scheduler 252 schedules a periodic "load from TMS" task. The task is queued in the queue 254. A TMS agent 256 receives the task and obtains the TMS files from the TMS file transfer protocol (FTP) server 258. When the scheduled time for the task is reached, the scheduler 252 sends the task as a message to the queue 260. If Java is used, a Java message service message may be provided to the queue 260. By sending the message to the queue 254, the scheduler 252 ensures that only one TMS agent in the cluster responds to the load data from a TMS request. The agent 256 may be a simple JMS client that listens to the queue 254. The TMS data loaders 262, 264 and 266 receive the TMS records and insert the records into a temporary table within the database 270. The TMS agent parses the TMS files and reads every station, schedule and program record. After each record is read, the agent 256 sends the unparsed TMS records to the queue 260. The unparsed TMS records are received from the queue by the data loaders 262, 264 and 266. The loaders 262-266 may reside in a cluster of loaders. By providing a cluster of data loaders 262-266, the responsibility of updating is provided to every server in the cluster. The loaders 262-266 that receive the unparsed records are responsible for creating appropriate listing objects and inserting the record to a temporary table within the database. The "JMS message receive" and the "insert to temporary table" may be under the same transaction. By updating the temporary table, the system avoids locking the main listing tables during TMS updates.

Once the TMS records are inserted into the temporary tables, the TMS agent 256 cleans the temporary database tables by removing the unreferenced schedules and programs. After cleaning the temporary tables, the TMS agent 256 moves all the listing data from the temporary tables to the main listing table. The data moved from the temporary to the main listing tables shall be executed by a serialized lock to the respective listing table. Once the TMS task is completed, the TMS agent uses a notification service 280 to notify the listing update to all of the components and services that are subscribed to the notification.

Figure 6:
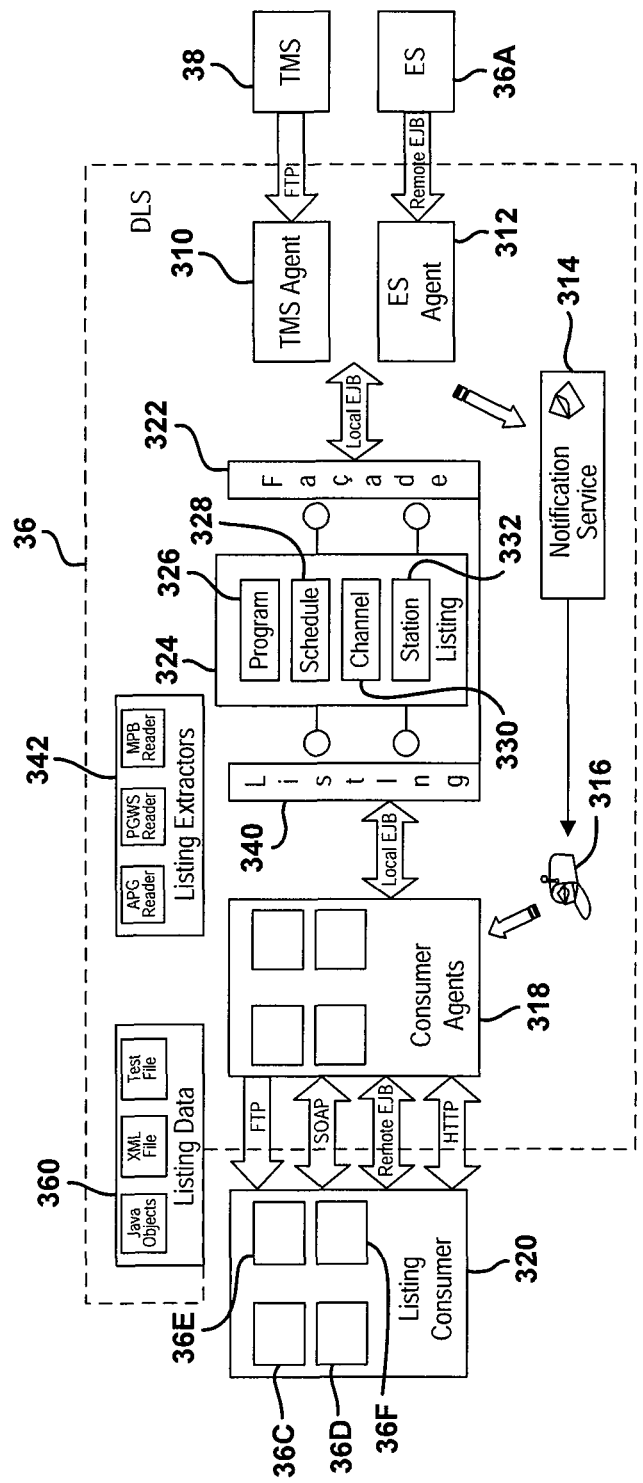
FIG. 6 is a block diagrammatic view of the system architecture for a listing system.

Referring now to FIG. 6, the DLS 36 is illustrated in further detail. Inputs from components such as the event schedule 36A and the external data input 38 are provided with an agent. For example, the external data input 38 includes an external data input agent 310 within the listing system 36 and the event scheduler 36A has an event scheduler agent 312 within the listing system 36. The external data input 38A may communicate with the agent 310 through file transfer protocol. The event scheduler 36A may communicate with the event scheduler agent 312 through a remote enterprise Java bean. A notification service 314 using a Java message service 316 may provide consumer agents 318 with a message that the listing data has been updated. This may be performed simultaneously or nearly simultaneously so that updates can be readily provided. This allows all systems to maintain near synchronous guide listings. The consumer agents 318 is illustrated with various boxes that may correspond with the various types of listing consumers 320. The listing consumers 320 may include the components such as the advance program guide 36C, the program guide generator 36D and the program guide web service 36E. Other consumers are illustrated by box 36F. Each of the consumer agents may communicate listing data 360 to the listing consumers in various manners including through file transfer protocol, through a simple object access protocol (SOAP), through a remote enterprise Java bean and through hypertext transfer protocol. This architecture de-couples the listing from the external databases. The listing façade 322 is in communication with the agents through a local enterprise Java bean. The listing façade 322 acts as the face of the listing with the other components that need to access and update the listing data. Every external interface that interacts with the DLS 36 will have a corresponding agent component in the DLS. The agents take care of communication and other business logic related to the external interfaces. As is illustrated, the façade interacts with the listing 324 which may include program data 326, schedule data 328, channel data 330 and station data 332. The listing may interface through the consumer agents 318 through the listing interface 340 through a local extended Java bean.

The consumer agents 318 use the listing façade 322 to read the listing data 360. Since each consumer only requires a limited set or subset of listing data 360, the agents 318 pass an extractor 342 to the façade to help in extracting only the required data from the listing. The extractor's objects form a visitor pattern with the listing façade 322. The extractors 342 are visitors and provide an indicator as to which data components to extract. The listing façade 322 accepts the visitors and initiates a visit operation on the visitor. A listing façade 322 also returns the appropriate extractor to the agents after invoking the visit operation. The extractors 342 de-couple the listing façade from the consumers. The extractors 342 act as an extension logic for the listing façade to extract consumer-specific data from the listing components. A listing data is illustrated as box 360.

To summarize, the listing consumer 320 requests data through the consumer agents 318 which, in turn, communicates with the façade 322. Listing extractors are provided to obtain the listing data 360. When changes are made to the listing 324, the notification service 314 provides a notification to the listing consumers 320 through the consumer agents 318.

Figure 7:
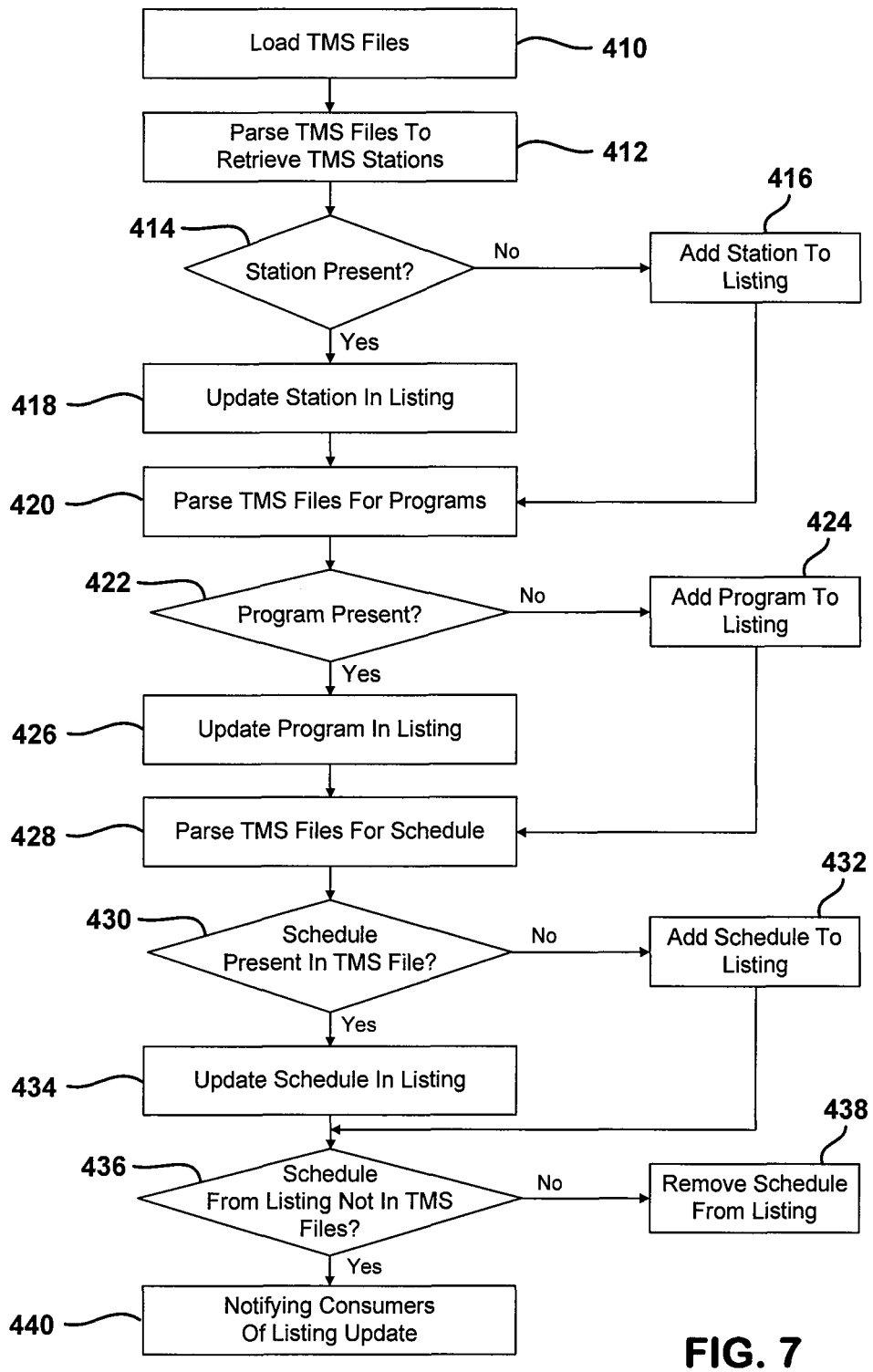
FIG. 7 is a flowchart of a method for loading external data.

Referring now to FIG. 7, a method of receiving external data files and updating a database is set forth. In this example, the external data files that will be referred to as Times Media Service files. However, various and numerous sources of data may be used. In step 410, a request to load TMS files is generated. This may be performed at a predetermined time for updating or upon a query. In step 412, the TMS file is parsed to retrieve the TMS stations. In step 414, if a station is not present, it may be added to the listing in step 416. In step 414, if the station is present in the database, step 418 updates the station in the listing. After step 418 and 416, the TMS files are parsed for programs. If the program is not present in step 422, step 424 adds the program to the listing. In step 422, if the program is present, step 426 updates the program in the listing. After steps 424 and 426, step 428 parses the TMS file for the TMS schedule. In step 430, if the schedule is not in the TMS file, step 432 adds the schedule to the listing. In step 430, if the schedule is in the TMS file, step 434 updates the schedule in the listing. After steps 434 and 432, if a schedule from the listing is not present in the TMS file in step 436, step 438 removes the schedule from the listing. In step 436, if the schedule from the listing is within the TMS file and after step 438, a notification of a listing update is provided to the various consumers of the listing data in step 440.

Figure 8:
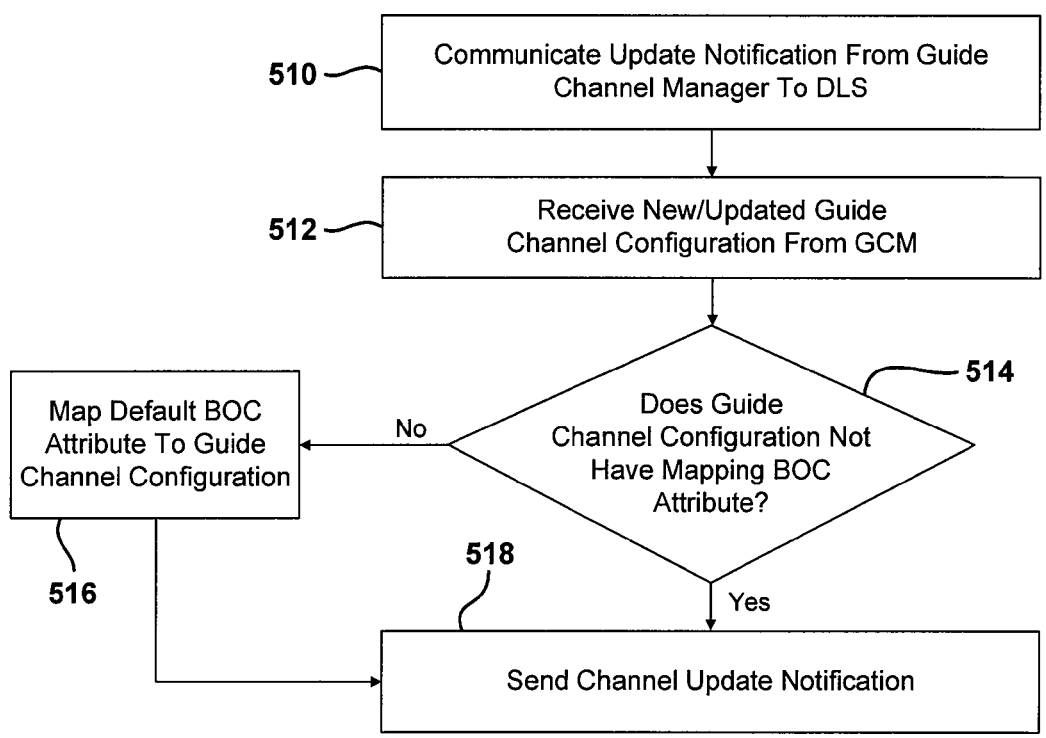
FIG. 8 is a flowchart of a method of updating guide channel data.

Referring now to FIG. 8, a method for updating the guide channel data is set forth. In step 510, an update notification is communicated from the guide channel manager to the listing service in step 510. The step presumes that the listing service is registered with the guide channel manager to receive guide channel updates. In step 512, new or updated guide channel configurations are received from the guide channel manager. In step 514, if the guide channel configuration does not have a mapping broadcast operation attribute, the system maps a default broadcast operation attribute to the guide channel configuration in step 516. If the guide channel configuration does have a mapping broadcast operation attribute in step 514, step 518 sends a channel update notification to the consumer or consumer agents.

Figure 9:
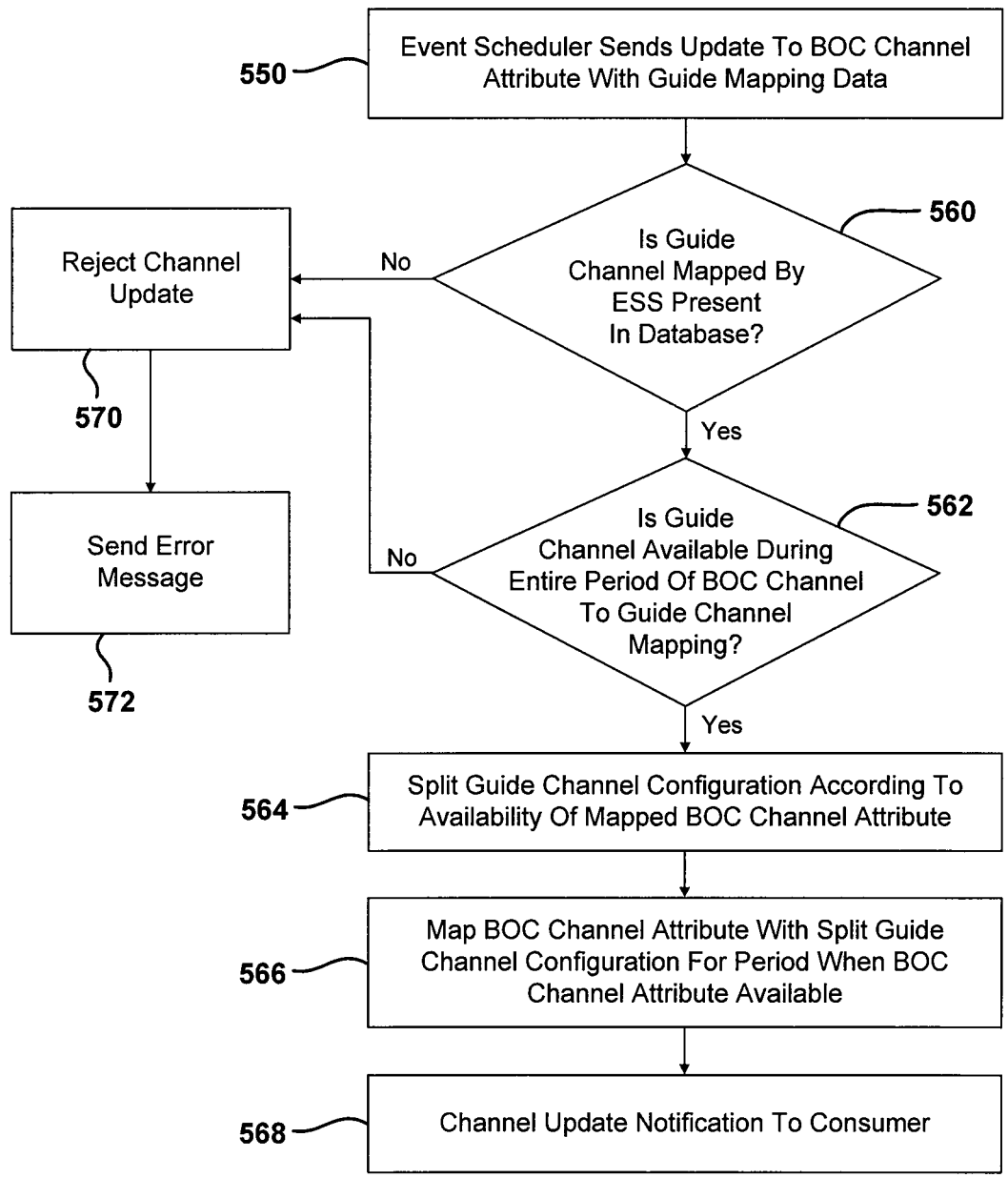
FIG. 9 is a flowchart of a method of updating broadcast operation channel data.

Referring now to FIG. 9, a method for updating broadcast operation channel data is set forth. Prior to this method, it is presumed that the listing server is registered with the event scheduler to receive broadcast operation channel updates. In step 550, the event scheduler sends an update to the broadcast operation channel attribute with guide mapping data. In step 560, if the guide channel map by the event scheduler is present in the database, step 562 determines whether the guide channel is available during the entire period of the broadcast operation channel to guide channel mapping. If the guide channel is available during the entire period of the broadcast operation channel to guide channel mapping in step 562, step 564 splits the guide channel configuration according to the availability of the mapped broadcast operation channel attribute in step 564. In step 566, the broadcast operation channel attribute with the split guide channel configuration for the period when the broadcast channel attribute is available is mapped. In step 568, a channel update notification is provided to the consumers through the consumers' agents.

Referring back to step 560, if the guide channel mapped by the event scheduler is not present in the database, the channel update is rejected in step 570 and an error message is sent in step 572. Likewise, in step 562 if the guide channel is not available during the entire period of the broadcast operation channel to guide channel mapping, steps 570 and 572 are performed which the channel update is rejected and an error message is sent.

Figure 10:
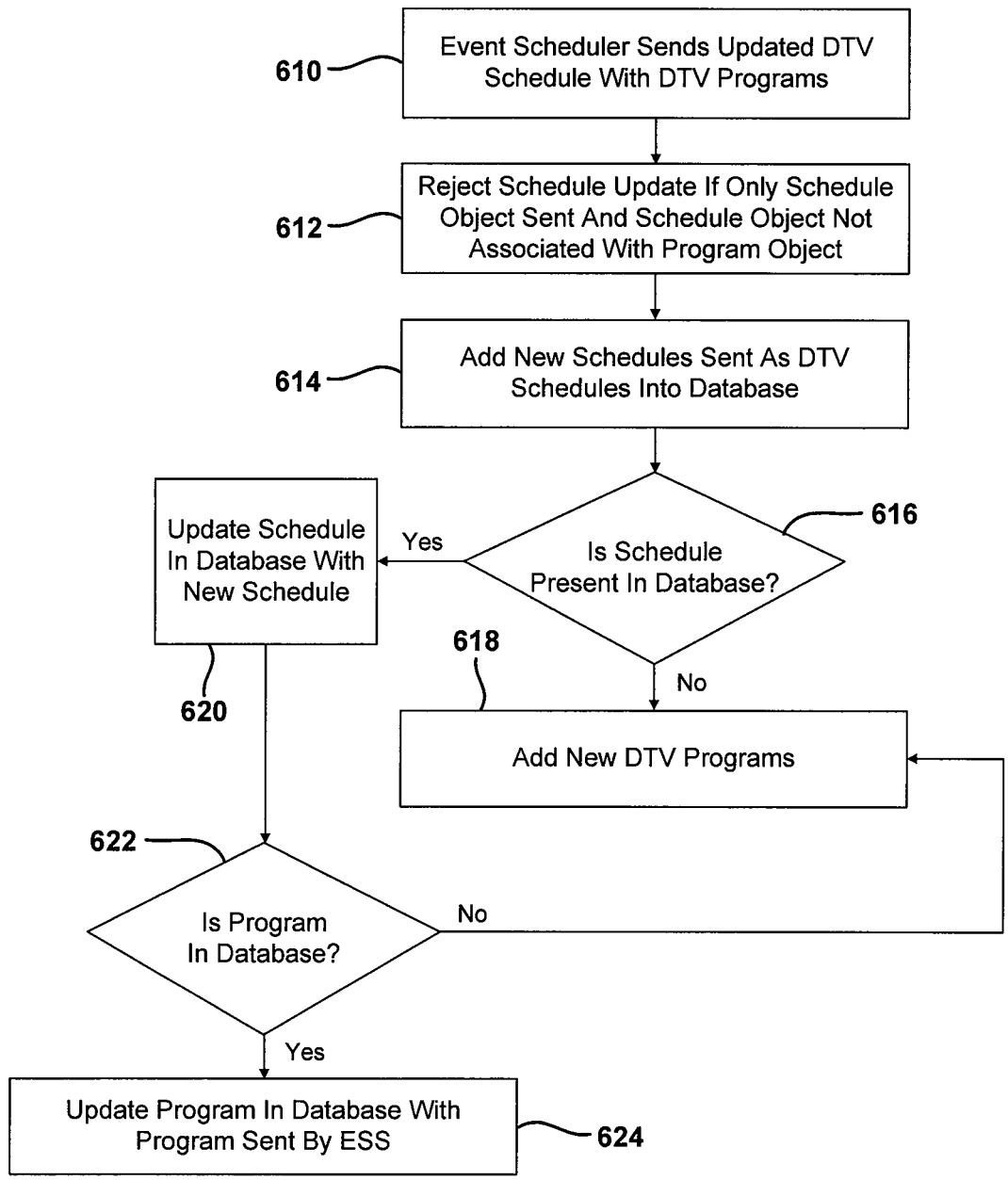
FIG. 10 is a flowchart of a method for updating internal schedules and programs.

Referring now to FIG. 10, a method for updating internal schedules (which in this example are DIRECTV® schedules) and programs is provided. The precondition for this method is that the event scheduler is registered to receive the DIRECTV® schedules and programs update. In step 610, the event scheduler sends an updated DIRECTV® schedule along with the associated DIRECTV® programs to the listing system. In step 612, the system rejects the schedule of updates sent by the event scheduler if a schedule is sent by the event schedule has only the schedule object and not an associated program object. In step 614, the listing service adds the new schedule sent as the DIRECTV® schedules into the database. In step 616, if the schedule is present in the database, the schedule is updated in the database with a new schedule. In step 616, if the schedule is not in the database, step 618 adds the new DIRECTV® or internal programs to the database. If the schedule is present in the database, step 620 updates the schedule in the database with a new schedule. If the program sent by the event scheduler in step 622 is in the database, step 624 updates the program database with the program sent by the event scheduler. In step 622, if the program is not in the database, the program is added to the database in step 618.

Figure 11:
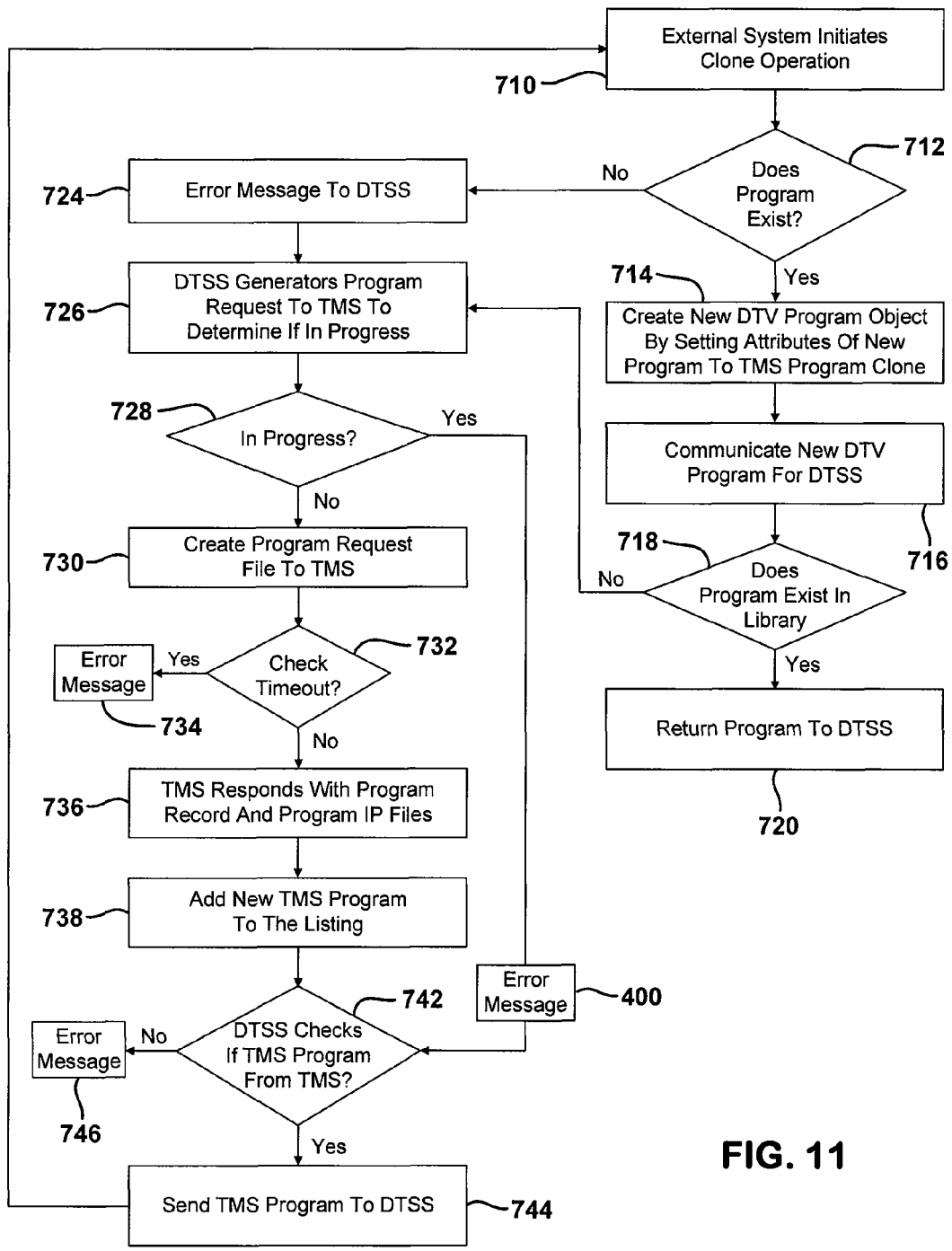
FIG. 11 is a flowchart of a method for cloning an external program.

Referring now to FIG. 11, a method for performing a cloning operation is set forth. In this operation, a new internal program is created by cloning an existing TMS program. The newly created program is sent to the event schedule and the newly created program is not added to the listing. In this system an external system such as the traffic and scheduling system initiates a cloned TMS operation in step 710. If the program does exist in step 712, a new program object is created by setting the attributes of the new program to the TMS program clone in step 714. After step 714, step 716 communicates the new DIRECTV® program to the traffic and scheduling system. In step 718, if the program does exist in the listing, the program is returned to the traffic and scheduling system in step 720. Referring back to step 712, if the program does not exist, an error message is sent to the traffic and scheduling system in step 724. The traffic and scheduling system then generates a program request to the external data system to get the required TMS program in step 726. If a program request is not in progress in step 728, step 730 creates a program request file to the TMS. If the system times out in step 732, an error message is generated in step 734. In step 732, if a time out has not been reached, the TMS responds with a program record and program identifier file in step 736. In step 738, a new TMS program is added to the program listing.

Referring back to step 728, if a program is in progress an error message is generated in step 740. After steps 740 and 738, the traffic and scheduling system determines if the TMS program has been received from the TMS system in step 742. After step 742, step 742 sends the TMS program to the TMS in step 744. If the TMS program has not been received in step 742, an error message is generated.

Figure 12:
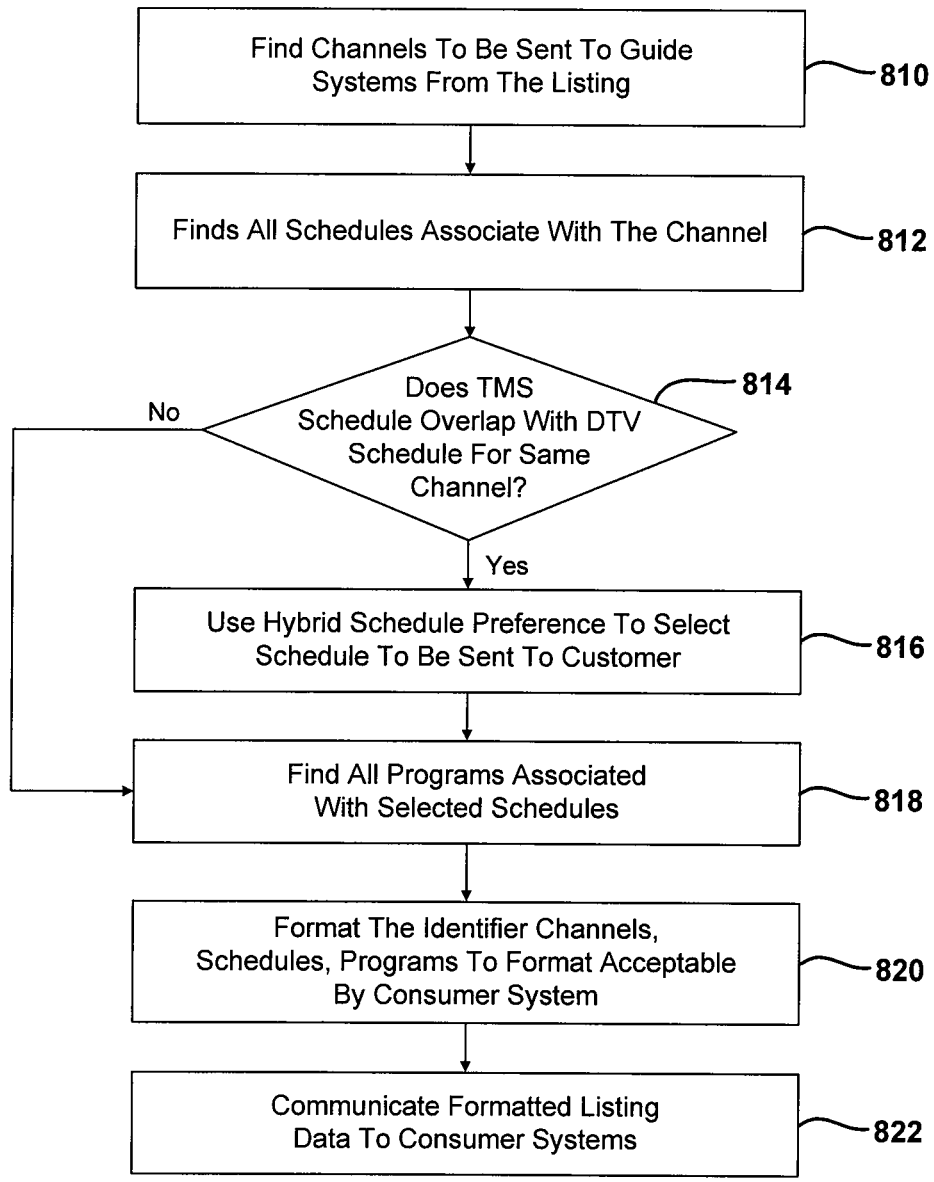
FIG. 12 is a flowchart of a method of sending a listing to a consumer system.

Referring now to FIG. 12, a method for sending a listing is set forth. In step 810, the channels to be sent to the guide system from the listing are found. In step 812, all the schedules associated with the channel are determined. In step 814, if the TMS schedule overlaps with the DIRECTV® schedule for the same channel, a hybrid schedule preference may be selected and sent to a consumer. The hybrid schedule may provide a method to resolve the conflict. After step 814 and after step 818, all the programs associated with the schedule are found. In step 820, the identifier channels, schedules and programs are formatted in a form that's acceptable by the particular consumer system. In step 822, the formatted listing data is provided to the appropriate consumer systems. Various formats for communicating the data may be used such as FTP, SOAP and HTTP. The listing data may be communicated simultaneously or nearly simultaneously to the various consumers. A notification may also be generated that allows the listing data consumers to generate a request for the listing data.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   electronically communicating station data, schedule data and program data from an event scheduler to a listing system;
   electronically communicating guide channel data from a guide channel manager separate from the event scheduler to the listing system;
   electronically communicating broadcast channel attribute data and a broadcast operation channel to guide channel mapping to the listing system;
   electronically forming a listing database from the guide channel data, the broadcast channel attribute data, the broadcast operation channel to guide channel mapping, the station data, the schedule data and the program data; and
   electronically communicating listing data from the listing database to an external system.

2. A method as recited in claim 1 wherein communicating the listing data comprises pushing the listing data to the external system.

3. A method as recited in claim 1 wherein communicating the listing data comprises pushing the listing data to the external system periodically.

4. A method as recited in claim 1 wherein communicating the listing data comprises pulling the listing data to the external system from the listing system.

5. A method as recited in claim 1 wherein communicating the listing data comprises communicating a change in the listing data to the external system.

6. A method as recited in claim 1 wherein prior to communicating the listing data, communicating an update notification to the external system.

7. A method as recited in claim 6 further comprising generating an update request at an external system in response to the update notification and wherein communicating the listing data comprises communicating the listing data in response to the update notification.

8. A method as recited in claim 1 wherein communicating the listing data comprises communicating the listing data to a program guide web service and communicating the listing data from the program guide web service to a partner service provider.

9. A method as recited in claim 1 wherein communicating the listing data comprises communicating the listing data to a program guide system, and further comprising communicating the listing data from the program guide system to a user device.

10. A method as recited in claim 1 wherein communicating the listing data comprises communicating the listing data to a program guide system, and further comprising communicating the listing data from the program guide system to a user device through a satellite.

11. A method as recited in claim 1 further comprising communicating internal program data and internal schedule data to the listing system and wherein forming the listing database comprises forming the listing database from the guide channel data, the broadcast channel attribute data, the broadcast operation channel to guide channel mapping, the station data, the schedule data, the program data, the internal program data and the internal schedule data.

12. A system comprising:
   a primary service provider comprising a listing system and an internal source;
   said listing system having a listing database associated therewith;
   an external data source external to the primary service provider communicating station data, external schedule data and external program data to the listing system;
   said internal source communicating internal program data to the listing system from within the primary service provider; and
   said listing system storing the station data, the external schedule data, the external program data and the internal program data in the listing database.

13. A system as recited in claim 12 wherein the internal source communicates broadcast channels to the listing system, said listing system forming the listing database from the broadcast channels.

14. A system as recited in claim 12 wherein the internal source communicates guide channel data to the listing database, said listing system forming the listing database from the guide channel data.

15. A system as recited in claim 12 further comprising a listing consumer receiving the listing data from the listing database.

16. A system as recited in claim 15 wherein the listing consumer comprises a program guide web service, said program guide web service in communication with a partner service provider.

17. A system as recited in claim 15 wherein the listing consumer comprises a program guide system, said program guide system in communication with a user device through a satellite.

18. A system as recited in claim 15 further comprising a notification service communicating a change notice to the listing consumer in response to a change in the listing database.

19. A system as recited in claim 15 further comprising a consumer agent formatting the listing data for the listing consumer.

* * * * *